US012547622B2

(12) United States Patent
Teflioudi et al.

(10) Patent No.: US 12,547,622 B2
(45) Date of Patent: *Feb. 10, 2026

(54) DYNAMICALLY GENERATED OPERATIONS IN A PARALLEL PROCESSING FRAMEWORK

(71) Applicant: SAP SE, Walldorf (DE)

(72) Inventors: Christina Teflioudi, Heidelberg (DE); Paul Willems, Heidelberg (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 23 days.

This patent is subject to a terminal disclaimer.

(21) Appl. No.: 18/779,922

(22) Filed: Jul. 22, 2024

(65) Prior Publication Data
US 2024/0378201 A1 Nov. 14, 2024

Related U.S. Application Data

(63) Continuation of application No. 17/735,493, filed on May 3, 2022, now Pat. No. 12,072,879.

(51) Int. Cl.
*G06F 16/2453* (2019.01)
*G06F 16/2455* (2019.01)

(52) U.S. Cl.
CPC .. *G06F 16/24542* (2019.01); *G06F 16/24539* (2019.01); *G06F 16/24554* (2019.01)

(58) Field of Classification Search
None
See application file for complete search history.

(56) References Cited

U.S. PATENT DOCUMENTS

| | | | |
|---|---|---|---|
| 10,853,365 B2 * | 12/2020 | Idei | G06F 16/24542 |
| 2015/0261765 A1 * | 9/2015 | Weyerhaeuser | G06F 16/10 707/713 |
| 2018/0150512 A1 * | 5/2018 | Merker | G06F 16/24542 |
| 2021/0081409 A1 * | 3/2021 | Rath | G06F 11/3419 |
| 2021/0133193 A1 * | 5/2021 | McConnell | G06N 20/00 |

* cited by examiner

*Primary Examiner* — Christopher J Raab
(74) *Attorney, Agent, or Firm* — Mintz Levin Cohn Ferris Glovsky and Popeo, P.C.

(57) ABSTRACT

A method for executing a dynamically generated operation in a parallel processing framework may include executing the dynamically generated operation sequentially for a threshold quantity of times before initiating a compilation operation to generate precompiled code for the dynamically generated operation. Upon generating the precompiled code, execution of the precompiled code may be parallelized by determining, based on a quantity of time required to execute the precompiled code on a portion of a dataset, a task size. The execution of the precompiled code may be divided, based on the task size, into one or more tasks. Moreover, a corresponding quantity of worker threads may be allocated to perform the one or more tasks in parallel. Related methods and computer program products are also provided.

20 Claims, 5 Drawing Sheets

S₃ | Precompiled Op 320 | S₁ | Dynamically Generated Op 300 | ... | Sₙ | Dynamically Generated Op 300 | S₂ | Precompiled Op 310

DYNAMICALLY GENERATED OPERATIONS IN A PARALLEL PROCESSING FRAMEWORK

CROSS REFERENCE TO RELATED APPLICATIONS

This application is a continuation of U.S. patent application Ser. No. 17/735,493 filed May 3, 2022, entitled "DYNAMICALLY GENERATED OPERATIONS IN A PARALLEL PROCESSING FRAMEWORK." The disclosure of which is incorporated herein by reference in its entirety.

TECHNICAL FIELD

The subject matter described herein relates generally to database processing and more specifically to dynamically generated operations in a parallel processing framework.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for performing a dynamically generated operation in a parallel processing framework. In some example embodiments, there is provided a system that includes at least one processor and at least one memory. The at least one memory may include program code that provides operations when executed by the at least one processor. The operations may include: executing sequentially a dynamically generated operation included in a query plan of a query on a dataset; upon executing the dynamically generated operation a threshold quantity of times, initiating a compilation operation to generate precompiled code for the dynamically generated operation; and upon generating the precompiled code, parallelizing execution of the precompiled code by at least determining, based at least on a first quantity of time required to execute the precompiled code on a portion of the dataset, a first task size, dividing, based at least on the first task size, the execution of the precompiled code into one or more tasks, and allocating a first quantity of worker threads to perform the one or more tasks in parallel.

In some variations, one or more features disclosed herein including the following features can optionally be included in any feasible combination. The dynamically generated operation may be associated with machine code that is dynamically generated prior to executing the query plan.

In some variations, an interpreter may be used to sequentially execute the dynamically generated operation.

In some variations, the parallelizing of the execution of the dynamically generated operation may be deferred until the precompiled code for the dynamically generated operation has been generated.

In some variations, the query plan may further include a precompiled operation that precedes the dynamically generated operation. The precompiled operation may be associated with precompiled machine code that is inserted into the query plan when generating the query plan.

In some variations, the operations may further include: allocating a second quantity of worker threads to execute a plurality of tasks comprising the precompiled operation in parallel; and upon completing execution of the precompiled operation, permitting a first worker thread of the second quantity of worker threads to execute the dynamically generated operation while a second worker thread of the second quantity of worker threads wait on a semaphore.

In some variations, each task of the plurality of tasks may have a second task size determined based at least on a second quantity of time required to execute the precompiled operation on the portion of the dataset.

In some variations, the precompiled code may be cached and reused for one or more same and/or similar queries.

In some variations, the one or more tasks may include a first task accessing a first partition of the dataset and a second task accessing a second partition of the dataset.

In some variations, the first partition of the dataset and the second partition of the dataset may be stored at different nodes in a database.

In another aspect, there is provided a method for performing a dynamically generated operation in a parallel processing framework. The method may include: executing sequentially a dynamically generated operation included in a query plan of a query on a dataset; upon executing the dynamically generated operation a threshold quantity of times, initiating a compilation operation to generate precompiled code for the dynamically generated operation; and upon generating the precompiled code, parallelizing execution of the precompiled code by at least determining, based at least on a first quantity of time required to execute the precompiled code on a portion of the dataset, a first task size, dividing, based at least on the first task size, the execution of the precompiled code into one or more tasks, and allocating a first quantity of worker threads to perform the one or more tasks in parallel.

In some variations, one or more features disclosed herein including the following features can optionally be included in any feasible combination. The dynamically generated operation may be associated with machine code that is dynamically generated prior to executing the query plan.

In some variations, an interpreter may be used to sequentially execute the dynamically generated operation.

In some variations, the parallelizing of the execution of the dynamically generated operation may be deferred until the precompiled code for the dynamically generated operation has been generated.

In some variations, the query plan may further include a precompiled operation that precedes the dynamically generated operation. The precompiled operation may be associated with precompiled machine code that is inserted into the query plan when generating the query plan.

In some variations, the method may further include: allocating a second quantity of worker threads to execute a plurality of tasks comprising the precompiled operation in parallel; and upon completing execution of the precompiled operation, permitting a first worker thread of the second quantity of worker threads to execute the dynamically generated operation while a second worker thread of the second quantity of worker threads wait on a semaphore.

In some variations, each task of the plurality of tasks may have a second task size determined based at least on a second quantity of time required to execute the precompiled operation on the portion of the dataset.

In some variations, the precompiled code may be cached and reused for one or more same and/or similar queries.

In some variations, the one or more tasks may include a first task accessing a first partition of the dataset and a second task accessing a second partition of the dataset. The first partition of the dataset and the second partition of the dataset may be stored at different nodes in a database.

In another aspect, there is provided a computer program product including a non-transitory computer readable medium storing instructions. The instructions may cause operations may executed by at least one data processor. The operations may include: executing sequentially a dynamically generated operation included in a query plan of a query on a dataset; upon executing the dynamically generated operation a threshold quantity of times, initiating a compilation operation to generate precompiled code for the dynamically generated operation; and upon generating the precompiled code, parallelizing execution of the precompiled code by at least determining, based at least on a first quantity of time required to execute the precompiled code on a portion of the dataset, a first task size, dividing, based at least on the first task size, the execution of the precompiled code into one or more tasks, and allocating a first quantity of worker threads to perform the one or more tasks in parallel.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to dynamically generated operations, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

An in-memory relational database may utilize main memory for the primary storage of database tables. In some cases, the in-memory relational database may be implemented as a column-oriented database (or a columnar database) that stores data from database tables by columns instead of by rows. As noted, each tuple of a relation may correspond to a record occupying one row of a database table while the columns of the database table may store the values of the common attributes shared by multiple tuples. Thus, in the columnar database, the values occupying each column of the database table, which may span multiple rows (or records) of the database table, may be stored sequentially in one or more data pages, with each data page storing at least a portion of a column. The in-memory column-oriented relational database may support efficient data compression and partitioning for massively parallel processing. Moreover, because the in-memory database is directly accessible by the central processing unit (CPU) of the computing engine, transactions accessing the in-memory database may be executed to provide near-instantaneous results.

The throughput and storage capacity of a database, such as an in-memory column-oriented relational database, may be maximized by distributing the processing and storage of data across multiple computing nodes. A single database table may therefore be divided into multiple partitions (or internal tables), for example, through one or more of hash partitioning, round-robin partitioning, and range partitioning, and stored across multiple computing nodes. Doing so may maximize opportunities for parallelization in which a single query is divided into multiple tasks and assigned to individual worker threads for parallel execution. As used herein, the term "worker thread" may refer to a thread or thread of execution, which is a sequence of instructions managed independently by a scheduler. Individual worker threads (e.g., the corresponding sequences of instructions) may be scheduled for sequential execution and/or parallel execution by one or multiple central processing units (CPUs).

In such a parallelization framework, a database execution engine may divide a query accessing a dataset (e.g., including one or more database tables) into a quantity of tasks whose size is determined during a sampling phase in which the database execution engine measures the quantity of time required to execute the query on a portion the dataset having a predetermined size. As such, if a large quantity of time is required to execute the query on the portion of the dataset, the database execution engine may determine that the query is computationally intensive and thus divide the query into a larger quantity of smaller tasks. Meanwhile, the quantity of worker threads allocated to execute the query may be determined based on the progress of the query observed at various time intervals. For instance, upon allocating an initial quantity of worker threads to perform the tasks associated with the query, the database execution engine may monitor the progress of the query (e.g., the quantity of tasks that have not been performed by any worker threads, the quantity of tasks that have been performed relative to the total quantity of outstanding tasks, and/or the like) to determine whether to increase that initial quantity of worker threads. That is, if the database execution engine detects an insufficient progress, the database execution engine may allocate additional worker threads to perform the tasks associated with the query.

The query operating on the dataset may be associated with a query plan that includes a sequence of operations for executing the query. In some example embodiments, the database execution engine may support a mixed execution model in which the sequence of operations include dynamically generated operations and precompiled operations. Precompiled operations may be associated with precompiled machine code created during the build process, along with the other programming code implementing the database. Accordingly, with precompiled operations, the same machine code may be inserted into the query plan of every query. Contrastingly, dynamically generated operations may be associated with machine code that is dynamically generated prior to the execution of the query plan. Dynamically generated operations are available in order to accommodate differences amongst queries that render the same machine code suboptimal and slow performing in at least some instances. As such, in order to execute a query with maximum performance, at least a portion of the query may be executed with code generated operators associated with dynamically generated machine code that is optimized for the specific characteristics of the that query. Nevertheless, because dynamically generated operations do impose certain overheads (e.g., generating and debugging code for dynamically generated operation are more difficult), the database execution engine may limit the use dynamically generated operations for portions of the query where the database execution engine expects to derive the most benefit therefrom.

A dynamically generated operation can be executed directly with the help of an interpreter but doing so tends to be slow the execution of the operation. Alternatively, a dynamically generated operation can be compiled with just-in-time-compilation, which allows the operation to be executed much quicker but is associated with a one-time compilation overhead. In order to maximize the benefits associated with dynamically generated operations, the database execution engine may execute a dynamically generated operation (e.g., using an interpreter) up to a threshold quantity of times (e.g., three times) without compiling the corresponding code use the interpreter to execute the code up to a specific number of times. After the dynamically generated operation has been executed the threshold quantity of times, the database execution engine may initiate the compilation of the code associated with the dynamically generated operation to generate a corresponding precompiled operation. For example, the compilation of the code may be performed as an asynchronous job, during which time the database execution engine may continue to execute the dynamically generated operation (e.g., using the interpreter). Once the precompiled code is ready, the database execution engine may switch to performing the operation using the precompiled code instead. In this manner, fast running queries processing small quantities of data may proceed with slower interpreted code while avoiding the delay associated with code compilation. Moreover, precompiled code for the operation may be maintained in a cache for reuse with the same and/or similar queries in the future.

In some example embodiments, the database execution engine may implement an adaptive parallel processing paradigm in order to support a mixed execution model that includes precompiled operations as well as dynamically generated operations. Instead of parallelizing precompiled operations as well as dynamically generated operations, the database execution engine may defer parallelizing a dynamically generated operation until precompiled code for the operation becomes available. This is because using interpreted code to perform an operation is much slower than using precompiled code. Parallelizing a dynamically generated operation while it is performed using interpreted code is therefore a waste of resources. Avoiding the parallelization of interpreted code is therefore an optimal strategy for maximizing throughput (e.g., by leaving resources free to be used by other queries such that more queries are served at the same time).

In some example embodiments, the database execution engine may execute the dynamically generated operation sequentially for up to the threshold quantity of times. Thereafter, the database execution engine may initiate an asynchronous job to compile the code associated with the dynamically generated operation. While the database execution engine may continue the execute the dynamically generated operation sequentially during the compilation of the corresponding code, the database execution engine may determine whether to parallelize and the size of the individual tasks once compiled code for the dynamically generated operation becomes available. For instance, during a sampling phase in which the database execution engine executes precompiled code, the database execution engine may determine the size of individual tasks based on the quantity of time required to execute the precompiled code on a portion the dataset having a predetermined size.

In some example embodiments, the database execution engine may discard the measurements taken when sampling during the execution of an operation using interpreted code. For example, while the database execution engine executes the interpreted code sequentially on a portion of dataset, the database execution engine may determine that interpreted code is being used. Accordingly, the database execution engine may discard the measurements, thereby foregoing parallelizing the execution of the interpreted code. The database execution engine may continue to discard these measurements until the database execution engine determines that precompiled code for the operation is available. At that point, the database execution engine may switch to using the compiled code for performing the operation. For example, during a sampling phase in which the database execution engine performs the operation using the precompiled code, the database execution engine may determine the size of individual tasks based on the quantity of time required to execute the precompiled code on a portion the dataset having a predetermined size.

Figure 1:
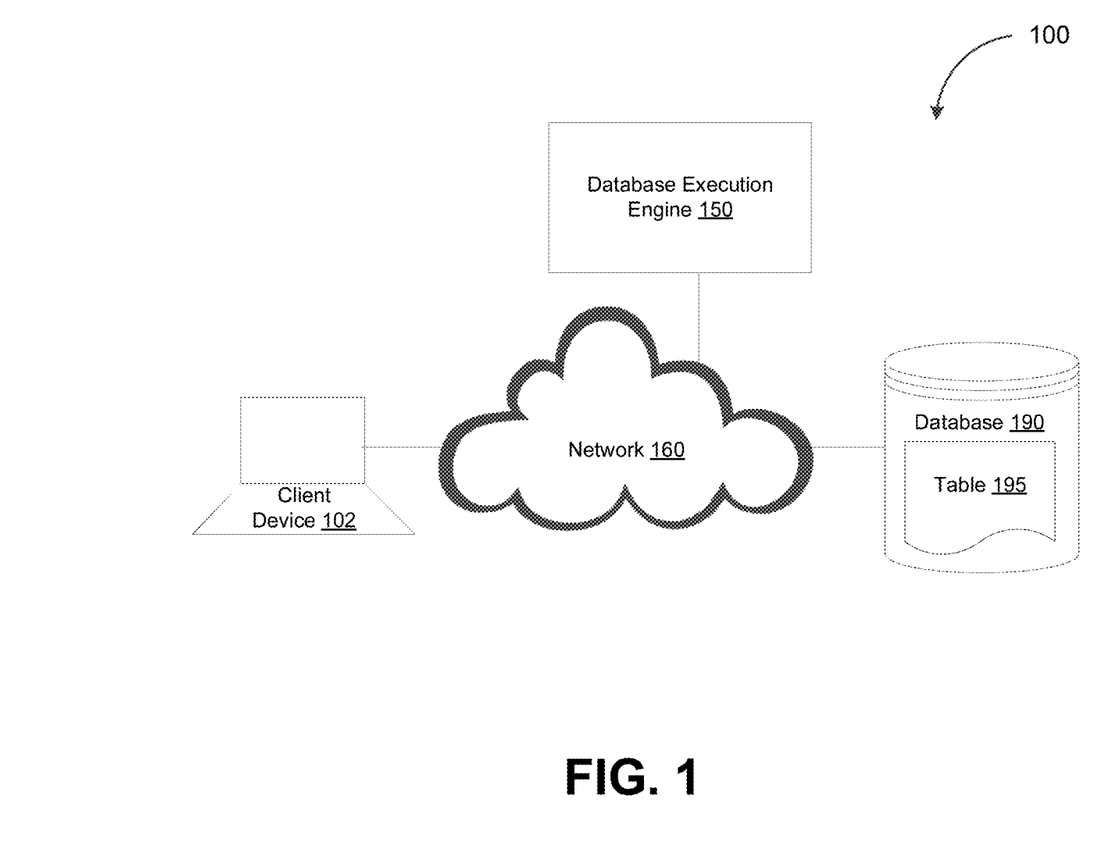
FIG. 1 depicts a system diagram illustrating an example of a database system, in accordance with some example embodiments.

FIG. 1 depicts a system diagram illustrating an example of a database system 100, in accordance with some example embodiments. Referring to FIG. 1, the database system 100 may include one or more client devices 102, a database execution engine 150, and one or more databases 190. As shown in FIG. 1, the one or more client devices 102, the database execution engine 150, and the one or more databases 190 may be communicative coupled via a network 160. The one or more databases 190 may include a variety of relational databases including, for example, an in-memory database, a column-based database, a row-based database, and/or the like. The one or more client devices 102 may include processor-based devices including, for example, a mobile device, a wearable apparatus, a personal computer, a workstation, an Internet-of-Things (IoT) appliance, and/or the like. The network 140 may be a wired network and/or wireless network including, for example, a public land mobile network (PLMN), a local area network (LAN), a virtual local area network (VLAN), a wide area network (WAN), the Internet, and/or the like.

Figure 2:
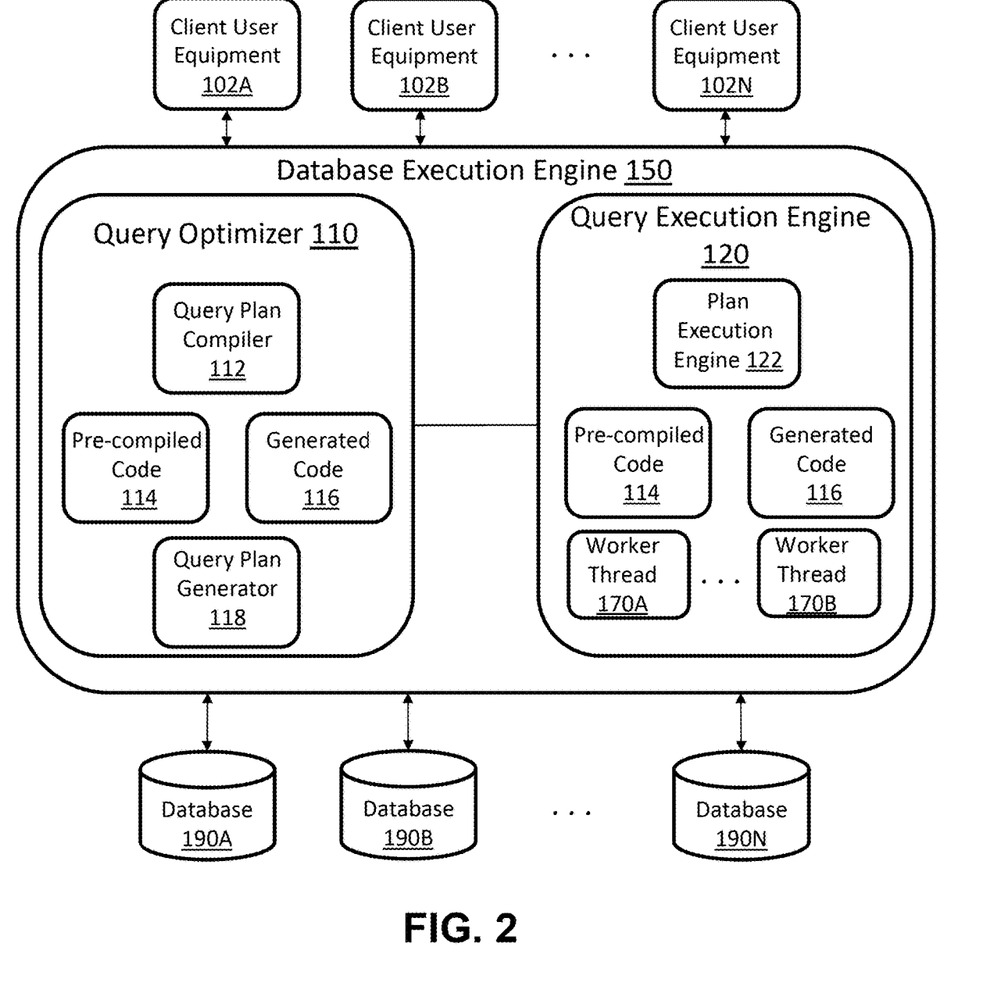
FIG. 2 depicts a block diagram illustrating an example of a database execution engine, in accordance with some example embodiments.

FIG. 2 depicts a block diagram illustrating an example of the database execution engine 150, in accordance with some example embodiments. As shown in FIG. 2, the one or more databases 190, which may include a first database 190A, a second database 190B, and a third database 190C, can represent the database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices 102, which may include the client devices 102A-N, may send a query via the database execution engine 150 to the database layer including the one or more databases 190, which may represent a persistence and/or storage layer where database tables may be stored and/or queried. The query may be sent via a connection, such as a wired connection and/or wireless connection (e.g., the Internet, cellular links, WiFi links, and/or the like) provided, for example, by the network 160.

Referring again to FIG. 2, the database execution engine 150 may include a query optimizer 110, such as a SQL optimizer and/or another type of optimizer, to receive at least one query from the one or more client devices 102 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra." The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190.

A query plan compiler 112 may enable compilation of at least a portion of the query plan. The query plan compiler 112 may compile the optimized query algebra into operations, such as program code and/or any other type of command, operation, object, or instruction. This code may include precompiled code 114 (which may be precompiled and stored and then selected for certain operations in the query plan) and/or generated code 116 generated specifically for execution of the query plan. For example, the query plan compiler 112 may select precompiled code 114 for a given operation as part of the optimization of the query plan, while for another operation in the query plan the query plan compiler 112 may allow a compiler to generate the code (i.e., generated code 116). The precompiled code 114 and the generated code 116 represent code for executing the query plan, and this code may be provided to a query plan generator 118, which interfaces with the query execution engine 120.

In some example embodiments, the query optimizer 110 may optimize the query plan by compiling and generating code. Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 102. The precompiled code 114 and/or the generated code 116 may be provided to a plan execution engine 122 of the query execution engine 120. The plan execution engine 122 may then prepare the plan for execution, and this query plan may include the precompiled code 114 and/or the generated code 116. When the code for the query plan is ready for execution during runtime, the query execution engine 120 may step through the code, performing some of the operations within the database execution engine 150 and sending some of the operations (or commands in support of an operation, such as a read, write, and/or the like) for execution at one or more of one or more database 190.

The query execution engine 120 may, as noted, be configured to handle different types of databases and the corresponding persistent layers and/or tables therein. For example, the one or more databases 190 may include at least one row-oriented database, in which case an insert is performed by adding a row with a corresponding row identifier. Alternatively and/or additionally, where the one or more databases 190 include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190. Moreover, the query execution engine 120 may perform other operations including rule-based operations, such as joins and projections, as well as filtering, group by, multi-dimensional analysis, and/or the like to reduce the processing burden on the database layer. In this way, the query execution engine 120 may execute these and other complex operations, while the one or more databases 190 can perform simpler operations to reduce the processing burden at the one or more databases 190.

In some example embodiments, the query execution engine 120 may run, as noted above, the generated code 116 generated for some operations, while the precompiled code 114 may be run for other operations. Moreover, the query execution engine 120 may combine the generated code 116 with the precompiled code 114 to further optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

In some example embodiments, the database layer may provide distributed data storage in which the processing and storage of data is distributed across multiple nodes including, for example, the first database 190A, the second database 190B, the third database 190C, and/or the like. Accordingly, to store a database table 195 at the one or more databases 190, the database execution engine 150 may divide the database table 195 into multiple partitions by applying one or more of a hash partitioning, round-robin partitioning, and range partitioning. For example, the database table 195 may be divided into a first partition, a second partition, and a third partition. Moreover, the first partition may be stored at the first database 190A, the second partition may be stored at the second database 190B, and the third partition may be stored at the third database 190C.

To execute a query accessing a dataset that includes, for example, the database table 195, the database execution engine 150 may divide the query into a quantity of tasks determined during a sampling phase based on the quantity of time required to execute the query on a portion the dataset having a predetermined size. Accordingly, if a large quantity of time is required to execute the query on the portion of the dataset, the database execution engine 150 may determine that the query is computationally intensive and thus divide the query into a larger quantity of smaller tasks. One or more of the worker threads 170 (e.g., a first worker thread 170A, a second worker thread 170B, and/or the like) may be allocated to perform the tasks associated with the query. The quantity of the worker threads 170 the database execution engine 150 allocates may be determined based on the progress of the query observed at various time intervals. For example, upon allocating an initial quantity of the worker threads 170 to perform the tasks associated with the query, the database execution engine 150 may monitor the progress of the query (e.g., the quantity of tasks that have not been performed by any the worker threads 170, the quantity of tasks that have been performed relative to the total quantity of outstanding tasks, and/or the like) to determine whether to increase that initial quantity of the worker threads 170.

In some example embodiments, the database execution engine 150 may support a mixed execution model in which the sequence of operations include dynamically generated operations and precompiled operations. The precompiled operations may be associated with the precompiled code 114, which may include manually generated code in a high level programming language and is inserted into a query plan during the generating of the query plan. Contrastingly, the dynamically generated operations may be associated with the generated code 116, which may be in a low-level assembly language and is dynamically generated during the generating of the query plan.

In some example embodiments, the database execution engine 150 may use an interpreter to execute a dynamically generated operation (e.g., the generated code 116) up to a threshold quantity of times (e.g., three times) without compiling the corresponding code. Before the dynamically generated operation is compiled into precompiled code, the database execution engine 150 may use an interpreter to execute the dynamically generated operation up to a threshold quantity of times. After the dynamically generated operation has been executed the threshold quantity of times, the database execution engine 150 may initiate the compilation of the code associated with the dynamically generated operation to generate precompiled code for the operation. For example, the code compilation may be performed as an asynchronous job, during which time the database execution engine may 150 continue to execute the dynamically generated operation using the interpreter. However, once the precompiled code is ready, the database execution engine 150 may use the precompiled operation instead to execute the operation instead.

As noted, the database execution engine 150 may determine, during a sampling phase, whether to parallelize the processing of a query and the size of the individual tasks into which to divide query. In some example embodiments, the database execution engine 150 may implement an adaptive parallel processing paradigm in order to support a mixed execution model that includes precompiled operations as well as dynamically generated operations. Instead of parallelizing a dynamically generated operation while the operation is still being performed using interpreted code, the database execution engine 150 may defer parallelizing a dynamically generated operation until precompiled code for the operation becomes available. For example, the database execution engine 150 may execute the dynamically generated operation sequentially for up to the threshold quantity of times. Thereafter, the database execution engine 150 may initiate an asynchronous job to compile the code associated with the dynamically generated operation such that the database execution engine 150 may continue to execute of the dynamically generated operation while the corresponding code is being compiled. The compilation of the code associated with the dynamically generated operation may be prioritized in order to minimize any concomitant delays. Moreover, the database execution engine 150 may avoid monopolizing use of the worker threads 170 for executing the query plan but periodically return control to the query execution engine 120, for example, the plan execution engine 120, to schedule the jobs for compiling the dynamically generated operations included in the query plan.

While the database execution engine 150 may continue the execute the dynamically generated operation sequentially during the compilation of the corresponding code, the database execution engine 150 may determine whether to parallelize and the size of the individual tasks once compiled code (e.g., the precompiled code 114) for the dynamically generated operation becomes available. For example, during a sampling phase in which the database execution engine 150 executes precompiled code, the database execution engine 150 may determine the size of individual tasks based on the quantity of time required to execute the precompiled operation (e.g., the precompiled code 114) on a portion the dataset having a predetermined size.

In some cases, the sequence of operations in the query plan may include a precompiled operation followed by a dynamically generated operation. Whereas multiple worker threads 170 may have been allocated to perform the precompiled operation in parallel, the database execution engine 150 may prevent the same quantity of worker threads from performing the dynamically generated operation. For example, the database execution engine 150 may permit a minimum quantity of the worker threads 170 to access the generated code 116 of the dynamically generated operation. Accordingly, while the first worker thread 170A is permitted to access the generated code 116 and perform the dynamically generated operation sequentially, other worker threads, such as the second worker thread 170B, may wait on a semaphore.

Figure 3:
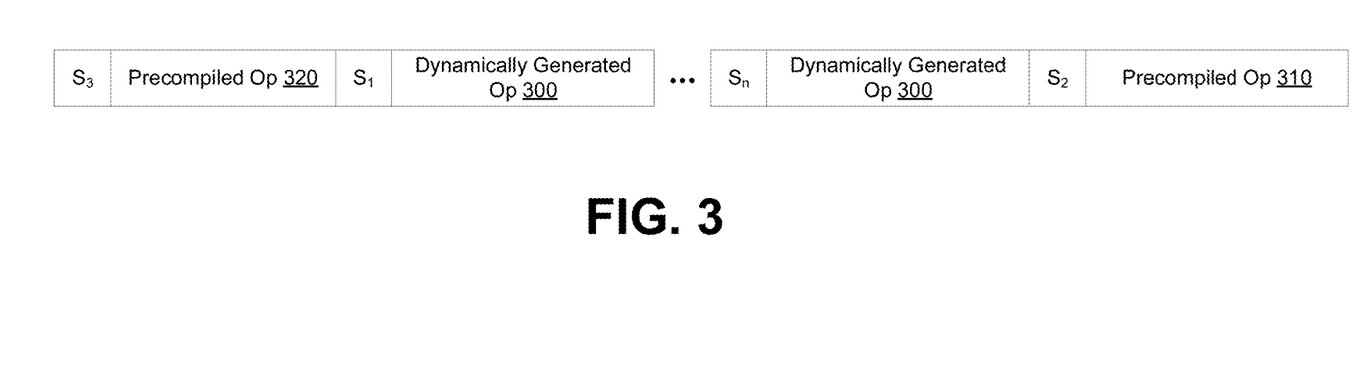
FIG. 3 depicts a schematic diagram illustrating an example of executing a dynamically generated operation in a parallel processing framework, in accordance with some example embodiments.

To further illustrate, FIG. 3 depicts a schematic diagram illustrating an example of executing a dynamically generated operation 300 in a parallel processing framework, in accordance with some example embodiments. In the example shown in FIG. 3, the database execution engine 150 may execute the dynamically generated operation 300 a threshold quantity of times (e.g., three times) before initiating an asynchronous job to generate precompiled code for the dynamically generated operation 300. Before the dynamically generated operation 300 is executed the threshold quantity of times and while the code for the dynamically generated operation 300 is being compiled, the database execution engine 150 may execute the dynamically generated operation 300 sequentially and without any parallelization. Accordingly, while the dynamically generated operation 300 remains un-compiled and is being performed using interpreted code, the scheduling operators $S_1$ through $S_n$ of each execution of the dynamically generated operation 300 may avoid parallelizing the performance of the dynamically generated operation 300, thus avoid dividing the dynamically generated operation 300 into an excessive quantity of small tasks and allocating too many of the worker threads 170.

However, once precompiled code for the dynamically generated operation 300 is available (thus generating the precompiled operation 310), the database execution engine 150 may determine to parallelize the execution of the precompiled operation 310. For example, the scheduling operator $S_2$ of the precompiled operation 310 may, during a sampling phase, measure the quantity of time required to perform the precompiled operation 310 on a portion the dataset having a predetermined size. Moreover, during the sampling phase, the scheduler operator $S_2$ may determine, based at least on the quantity of time required to perform the precompiled operation 310 on the portion a dataset having the predetermined size, the size of the individual tasks associated with the precompiled operation 310.

Referring again to FIG. 3, the dynamically generated operation 300 may be a part of a sequence of operations in a query plan. In the example shown in FIG. 3, the dynamically generated operation 300 may be preceded by another precompiled operation 320. The scheduler operator $S_3$ of the precompiled operation 320 may determine to divide the precompiled operation 320 into multiple tasks, each of which having a size corresponding to the quantity of time required to execute the precompiled operation 320 on a portion of the dataset. Moreover, the scheduler operator $S_3$ may allocate multiple worker threads 170, such as the first worker thread 170A and the second worker thread 170B, to perform each task. Upon completing the precompiled operation 320, the database execution engine 150 may minimize the quantity of worker threads permitted to access the dynamically generated operation 300 (e.g., the generated code 116).

Consider one scenario in which the precompiled operation 320 is a filtering operation that creates a skew in the dataset such that the output of the precompiled operation 320 is significantly smaller in size than that of its input. Accordingly, it is possible that the precompiled operation 320 its sampling phase without having executed the dynamically generated operator 300. Accordingly, multiple worker threads 170 may have been allocated as a result of the sampling performed during the performance of the precompiled operation 320. In order to prevent multiple worker threads 170 from performing the dynamically generated operation 300, the database execution engine 150 may be configured to permit a minimum quantity of the worker threads to access the dynamically generated operation 300. For example, while the database execution engine 150 may permit the first worker thread 170A to perform the dynamically generated operation sequentially, other worker threads, such as the second worker thread 170B, may wait on a semaphore. These waiting worker threads, such as the second worker thread 170B, may be identified by the query execution engine 120 (e.g., the plan execution engine 122) and remain available for use elsewhere until signaled.

Figure 4:
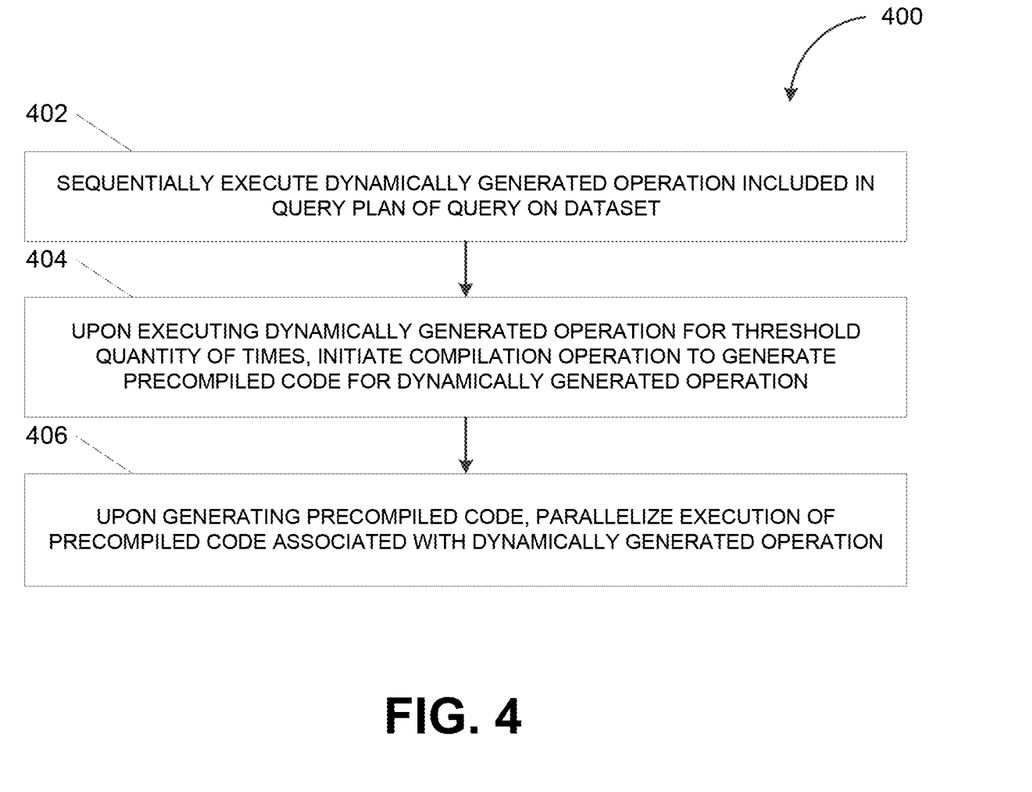
FIG. 4 depicts a flowchart illustrating an example of a process for executing a dynamically generated operation in a parallel processing framework, in accordance with some example embodiments.

FIG. 4 depicts a flowchart illustrating an example of a process 400 for executing a dynamically generated operation in a parallel processing framework, in accordance with some example embodiments. Referring to FIG. 4, the process 400 may be performed by the database execution engine 150, for example, by the plan execution engine 122 of the query execution engine 120.

At 402, the database execution engine 150 may sequentially execute a dynamically generated operation included in a query plan of a query on a dataset. In some example embodiments, the database execution engine 150 may avoid parallelizing the execution of a dynamically generated operation at least because sampling the execution of the dynamically generated operation using interpreted code may be distorted by the larger quantity of time required to perform the dynamically generated operation using interpreted code. This skew may cause the database execution engine 150 to divide the dynamically generated operation into too many small tasks for performing a corresponding precompiled operation when the database execution engine 150 eventually generates precompiled code for the operation after the dynamically generated operation has been executed a threshold quantity of times (e.g., three times). Accordingly, instead of parallelizing the performance of a dynamically generated operation, the database execution engine 150 may execute the dynamically generated operation sequentially and defer any parallelization until precompiled code associated with the dynamically generated operation becomes available.

At 404, the database execution engine 150 may, upon sequentially executing the dynamically generated operation for a threshold quantity of times, initiate a compilation operation to generate precompiled code for the dynamically generated operation. For example, in some cases, the database execution engine 150 may initiate the compilation operation to generate precompiled code for the dynamically generated operation after executing the dynamically generated operation sequentially three times. The database execution engine 150 may initiate an asynchronous job to compile the code associated with the dynamically generated operation. Moreover, the compilation of the code associated with the dynamically generated operation may be prioritized in order to minimize any concomitant delays.

At 406, the database execution engine 150 may, upon generating the precompiled code, parallelize execution of the precompiled code associated with the dynamically generated operation. In some example embodiments, the database execution engine 150 may continue to execute the dynamically generated operation sequentially (e.g., using interpreted code) until precompiled associated with the dynamically generated operation becomes available. At that point, the database execution engine 150 may determine to parallelize the execution of the dynamically generated operation. For example, the database execution engine 150 may, during a sampling phase, measure the quantity of time required to execute the precompiled code on a portion of the dataset having a predetermined size. Moreover, the database execution engine 150 may determine, based at least on the quantity of time required to execute the precompiled code on the portion of the dataset, a size of individual tasks. As such, if a large quantity of time is required to execute the query on the portion of the dataset, the database execution engine 150 may determine to divide the execution of the precompiled code into a larger quantity of smaller tasks. Furthermore, the database execution engine 150 may allocate a corresponding quantity of worker threads 170 to perform the individual tasks in parallel. For instance, the database execution engine 150 may allocate the first worker thread 170A to perform a first task and the second worker thread 170B to perform a second task.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: executing sequentially a dynamically generated operation included in a query plan of a query on a dataset; upon executing the dynamically generated operation a threshold quantity of times, initiating a compilation operation to generate precompiled code for the dynamically generated operation; and upon generating the precompiled code, parallelizing execution of the precompiled code by at least determining, based at least on a first quantity of time required to execute the precompiled code on a portion of the dataset, a first task size, dividing, based at least on the first task size, the execution of the precompiled code into one or more tasks, and allocating a first quantity of worker threads to perform the one or more tasks in parallel.

Example 2: The system of Example 1, wherein the dynamically generated operation is associated with machine code that is dynamically generated prior to executing the query plan.

Example 3: The system of any one of Examples 1 to 2, wherein an interpreter is used to sequentially execute the dynamically generated operation.

Example 4: The system of any one of Examples 1 to 3, wherein the parallelizing of the execution of the dynamically generated operation is deferred until the precompiled code for the dynamically generated operation has been generated.

Example 5: The system of any one of Examples 1 to 4, wherein the query plan further includes a precompiled operation that precedes the dynamically generated operation, and wherein the precompiled operation is associated with precompiled machine code that is inserted into the query plan when generating the query plan.

Example 6: The system of Example 5, wherein the operations further comprise: allocating a second quantity of worker threads to execute a plurality of tasks comprising the precompiled operation in parallel; and upon completing execution of the precompiled operation, permitting a first worker thread of the second quantity of worker threads to execute the dynamically generated operation while a second worker thread of the second quantity of worker threads wait on a semaphore.

Example 7: The system of Example 6, wherein each task of the plurality of tasks has a second task size determined based at least on a second quantity of time required to execute the precompiled operation on the portion of the dataset.

Example 8: The system of any one of Examples 1 to 7, wherein the precompiled code is cached and reused for one or more same and/or similar queries.

Example 9: The system of any one of Examples 1 to 8, wherein the one or more tasks include a first task accessing a first partition of the dataset and a second task accessing a second partition of the dataset.

Example 10: The system of any one of Examples 1 to 9, wherein the first partition of the dataset and the second partition of the dataset are stored at different nodes in a database.

Example 11: A method, comprising: executing sequentially a dynamically generated operation included in a query plan of a query on a dataset; upon executing the dynamically generated operation a threshold quantity of times, initiating a compilation operation to generate precompiled code for the dynamically generated operation; and upon generating the precompiled code, parallelizing execution of the precompiled code by at least determining, based at least on a first quantity of time required to execute the precompiled code on a portion of the dataset, a first task size, dividing, based at least on the first task size, the execution of the precompiled code into one or more tasks, and allocating a first quantity of worker threads to perform the one or more tasks in parallel.

Example 12: The method of Example 11, wherein the dynamically generated operation is associated with machine code that is dynamically generated prior to executing the query plan.

Example 13: The method of any one of Examples 11 to 12, wherein an interpreter is used to sequentially execute the dynamically generated operation.

Example 14: The method of any one of Examples 11 to 13, wherein the parallelizing of the execution of the dynamically generated operation is deferred until the precompiled code for the dynamically generated operation has been generated.

Example 15: The method of any one of Examples 11 to 14, wherein the query plan further includes a precompiled operation that precedes the dynamically generated operation, and wherein the precompiled operation is associated with precompiled machine code that is inserted into the query plan when generating the query plan.

Example 16: The method of Example 15, further comprising: allocating a second quantity of worker threads to execute a plurality of tasks comprising the precompiled operation in parallel; and upon completing execution of the precompiled operation, permitting a first worker thread of the second quantity of worker threads to execute the dynamically generated operation while a second worker thread of the second quantity of worker threads wait on a semaphore.

Example 17: The method of Example 16, wherein each task of the plurality of tasks has a second task size determined based at least on a second quantity of time required to execute the precompiled operation on the portion of the dataset.

Example 18: The method of any one of Examples 11 to 17, wherein the precompiled code is cached and reused for one or more same and/or similar queries.

Example 19: The method of any one of Examples 11 to 18, wherein the one or more tasks include a first task accessing a first partition of the dataset and a second task accessing a second partition of the dataset, and wherein the first partition of the dataset and the second partition of the dataset are stored at different nodes in a database.

Example 20: A non-transitory computer readable medium storing instructions, which when executed by at least one data processor, result in operations comprising: executing sequentially a dynamically generated operation included in a query plan of a query on a dataset; upon executing the dynamically generated operation a threshold quantity of times, initiating a compilation operation to generate precompiled code for the dynamically generated operation; and upon generating the precompiled code, parallelizing execution of the precompiled code by at least determining, based at least on a first quantity of time required to execute the precompiled code on a portion of the dataset, a first task size, dividing, based at least on the first task size, the execution of the precompiled code into one or more tasks, and allocating a first quantity of worker threads to perform the one or more tasks in parallel.

Figure 5:
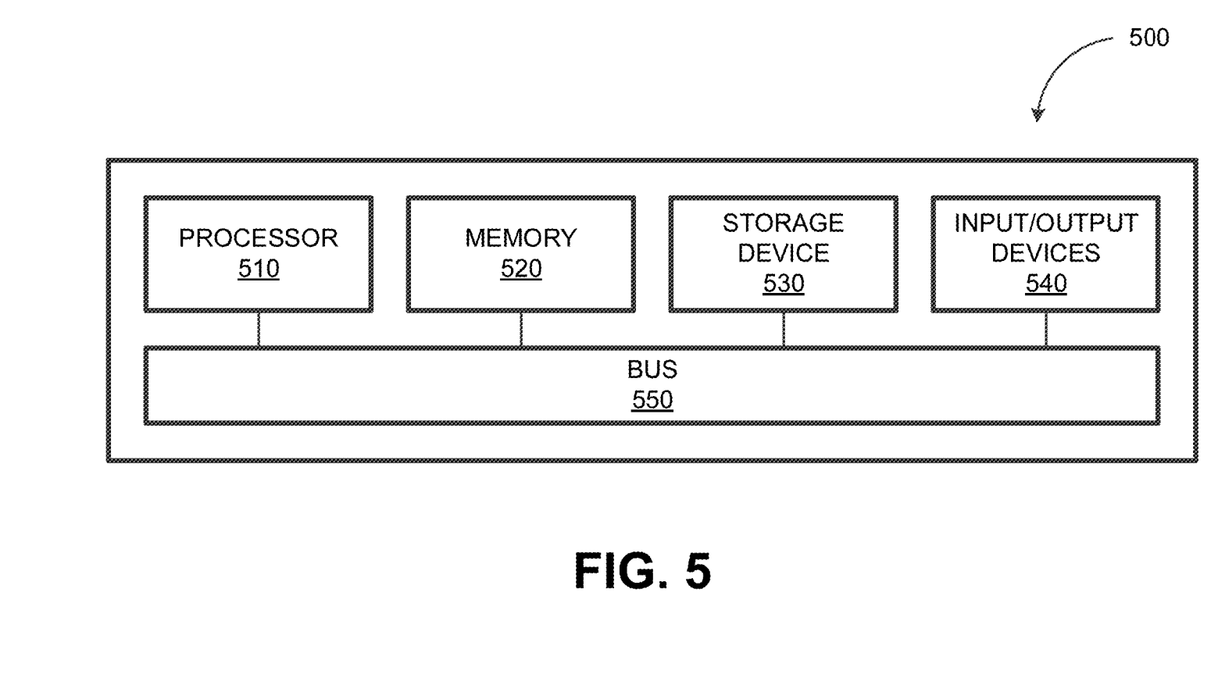
FIG. 5 depicts a block diagram illustrating an example of a computing system, in accordance with some example embodiments.

FIG. 5 depicts a block diagram illustrating an example of a computing system 500 consistent with implementations of the current subject matter. Referring to FIGS. 1-5, the computing system 500 may implement the database execution engine 150 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database execution engine 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor, and
    at least one memory storing instructions which, when executed by the at least one data processor, cause operations comprising:
        initiating a compilation operation to generate precompiled code for a dynamically generated operation that is executed a threshold quantity of times, the dynamically generated operation included in a query plan for a query on a dataset; and
        parallelizing execution of the precompiled code by at least
            determining, based at least on a first quantity of time required to execute the precompiled code on a portion of the dataset, a first task size,
            dividing, based at least on the first task size, the execution of the precompiled code into one or more tasks, and
            allocating a first quantity of worker threads to perform the one or more tasks in parallel.

2. The system of claim 1, wherein the dynamically generated operation is associated with machine code that is dynamically generated prior to executing the query plan.

3. The system of claim 1, wherein an interpreter is used to sequentially execute the dynamically generated operation.

4. The system of claim 1, wherein the parallelizing of the execution of the dynamically generated operation is deferred until the precompiled code for the dynamically generated operation has been generated.

5. The system of claim 1, wherein the query plan further includes a precompiled operation that precedes the dynamically generated operation, and wherein the precompiled operation is associated with precompiled machine code that is inserted into the query plan when generating the query plan.

6. The system of claim 5, further comprising:
    allocating a second quantity of worker threads to execute a plurality of tasks comprising the precompiled operation in parallel; and
    upon completing execution of the precompiled operation, permitting a first worker thread of the second quantity of worker threads to execute the dynamically generated operation while a second worker thread of the second quantity of worker threads wait on a semaphore.

7. The system of claim 6, wherein each task of the plurality of tasks has a second task size determined based at least on a second quantity of time required to execute the precompiled operation on the portion of the dataset.

8. The system of claim 1, wherein the precompiled code is cached and reused for one or more same and/or similar queries.

9. The system of claim 1, wherein the one or more tasks include a first task accessing a first partition of the dataset and a second task accessing a second partition of the dataset.

10. The system of claim 9, wherein the first partition of the dataset and the second partition of the dataset are stored at different nodes in a database.

11. A computer-implemented method, comprising:
    initiating a compilation operation to generate precompiled code for a dynamically generated operation that is executed a threshold quantity of times, the dynamically generated operation included in a query plan for a query on a dataset; and
    parallelizing execution of the precompiled code by at least
        determining, based at least on a first quantity of time required to execute the precompiled code on a portion of the dataset, a first task size,
        dividing, based at least on the first task size, the execution of the precompiled code into one or more tasks, and
        allocating a first quantity of worker threads to perform the one or more tasks in parallel.

12. The method of claim 11, wherein the dynamically generated operation is associated with machine code that is dynamically generated prior to executing the query plan.

13. The method of claim 11, wherein an interpreter is used to sequentially execute the dynamically generated operation.

14. The method of claim 11, wherein the parallelizing of the execution of the dynamically generated operation is deferred until the precompiled code for the dynamically generated operation has been generated.

15. The method of claim 11, wherein the query plan further includes a precompiled operation that precedes the dynamically generated operation, and wherein the precompiled operation is associated with precompiled machine code that is inserted into the query plan when generating the query plan.

16. The method of claim 15, further comprising:
   allocating a second quantity of worker threads to execute a plurality of tasks comprising the precompiled operation in parallel; and
   upon completing execution of the precompiled operation, permitting a first worker thread of the second quantity of worker threads to execute the dynamically generated operation while a second worker thread of the second quantity of worker threads wait on a semaphore.

17. The method of claim 16, wherein each task of the plurality of tasks has a second task size determined based at least on a second quantity of time required to execute the precompiled operation on the portion of the dataset.

18. The method of claim 11, wherein the precompiled code is cached and reused for one or more same and/or similar queries.

19. The method of claim 11, wherein the one or more tasks include a first task accessing a first partition of the dataset and a second task accessing a second partition of the dataset, and wherein the first partition of the dataset and the second partition of the dataset are stored at different nodes in a database.

20. A non-transitory computer readable medium storing instructions, which when executed by at least one data processor, result in operations comprising:
   initiating a compilation operation to generate precompiled code for a dynamically generated operation that is executed a threshold quantity of times, the dynamically generated operation included in a query plan for a query on a dataset; and
   parallelizing execution of the precompiled code by at least
   determining, based at least on a first quantity of time required to execute the precompiled code on a portion of the dataset, a first task size,
   dividing, based at least on the first task size, the execution of the precompiled code into one or more tasks, and
   allocating a first quantity of worker threads to perform the one or more tasks in parallel.

* * * * *